United States Patent [19]

Ueno et al.

[11] Patent Number: 5,257,943
[45] Date of Patent: Nov. 2, 1993

[54] ROTARY CONNECTOR

[75] Inventors: Seiichi Ueno; Masahiro Hasegawa, both of Tokyo, Japan

[73] Assignee: The Furukawa Electric Co., Ltd., Tokyo, Japan

[21] Appl. No.: 980,910

[22] Filed: Nov. 24, 1992

[30] Foreign Application Priority Data

Nov. 26, 1991 [JP] Japan .................. 3-096986[U]

[51] Int. Cl.$^5$ .............................................. H01R 39/02
[52] U.S. Cl. .......................................... 439/164; 439/15
[58] Field of Search .......................................... 439/15, 164

[56] References Cited

U.S. PATENT DOCUMENTS 4,722,690  2/1988  Priede .
4,797,109  1/1989  Wende ............................ 439/15
4,975,064  12/1990  Takahashi et al. ............. 439/164 X

FOREIGN PATENT DOCUMENTS 63-237383  10/1988  Japan .
1-112682  5/1989  Japan ............................ 439/15

Primary Examiner—Eugene F. Desmond
Attorney, Agent, or Firm—Frishauf, Holtz, Goodman & Woodward

[57] ABSTRACT

A rotary connector which comprises a rotating case and a stationary case combined for rotation and defining an annular space therein, a flexible flat cable housed in the form of a spiral in the annular space, and a fixing member for regulating the relative rotation of the two cases. The fixing member is removably mounted extending between mounting portions formed individually on the cases, the flat cable tightening and loosening so that the rotating case is allowed to rotate relatively to the stationary case. The fixing member is provided integrally with an indicating portion for restraining the fixing member from being disengaged from the mounting portions and indicating the release of the cases from fixation by being fractured or deformed by a predetermined stress which forces the fixing member to be disengaged from the mounting portions.

8 Claims, 10 Drawing Sheets

ROTARY CONNECTOR

BACKGROUND OF THE INVENTION

1. Field of the Invention

The present invention relates to a rotary connector having a fixing pin for regulating the relative rotation of a rotating case and a stationary case.

2. Description of the Related Art

A rotary connector is used as a connector device for a flexible transmission medium which transfers electrical signals, optical signals, electric power, etc. between a rotating member and a stationary member rotating relatively to each other within a limited range of rotational number. In this rotary connector, a flexible flat cable is housed in the form of a spiral in an annular space defined by a rotating case and a stationary case which are combined for rotation. The rotating case is allowed to rotate relatively to the stationary case as the flat cable is tightened or loosened.

The rotary connector is designed so that the flat cable is oriented to a neutral position with respect to its tightening and loosening actions as it is fixed after assembly, in order to secure the same rotational number for either direction of a tightening or loosening. In mounting the rotary connector in the steering apparatus of an automobile, for example, the steering wheel is adjusted to a straight-advance position as the connector is set in position. Thus, the steering apparatus can securely enjoy proper operation.

According to conventional means for fixing the rotary connector to the neutral position, a fixing pin having retaining hooks, called snap fits, is removably mounted extending between mounting portions on the rotating and stationary cases, or a seal is pasted on both the cases.

If the fixing pin, which can be easily mounted and removed, is used as the means for fixing the rotary connector, any person can readily release the connector from fixation. Even though the rotary connector is adjusted to the neutral position with respect to its tightening and loosening actions before it is shipped, therefore, the fixation may be removed mischievously or by an accident so that the flat cable is deviated from the neutral position before the connector is mounted in a vehicle. However, this fact cannot be easily recognized from the appearance of the connector.

If the seal is used, on the other hand, a deliberate act, such as mischief, performed on the rotary connector adjusted to the neutral position can be detected from separation or fracture of the seal, so that the connector can be prevented from being wrongly mounted in the vehicle. However, the seal is liable to be separated or fractured by heat or vibration during transportation. In case of accidental or intentional separation, therefore, the rotary connector is expected to be readjusted to the neutral position. Thus, the seal is not a desirable means at all for fixing the rotary connector.

SUMMARY OF THE INVENTION

The object of the present invention is to provide a rotary connector capable of being securely fixed and of definitely indicating removal of fixation after assembly.

In order to achieve the above object, according to the present invention, there is provided a rotary connector which comprises a rotating case and a stationary case combined for rotation and defining an annular space therein, a flexible flat cable housed in the form of a spiral in the annular space, and a fixing pin for regulating the relative rotation of the two cases, the fixing pin being removably mounted extending between mounting portions formed individually on the cases, the flat cable tightening and loosening so that the rotating case is allowed to rotate relatively to the stationary case. The fixing pin is provided integrally with a retaining portion for restraining the fixing pin from being disengaged from the mounting portions and indicating a release of the cases from their fixed state by being fractured or deformed by a predetermined stress which forces the fixing pin to be disengaged from the mounting portions.

When the predetermined stress acts in the direction of disengagement of the fixing pin, the retaining portion is fractured or deformed, so that removal of fixation can be recognized at a glance.

In the rotary connector according to the present invention, the flat cable can be kept in a neutral position with respect to its tightening and loosening actions, so that the rotating and stationary cases can be securely fixed by means of the fixing pin during transportation before use. According to the rotary connector of the invention, moreover, removal of the fixation after assembly can be definitely recognized from the appearance of the retaining portion.

The above and other objects, features, and advantages of the invention will be more apparent from the ensuing detailed description taken in connection with the accompanying drawings.

DETAILED DESCRIPTION OF THE PREFERRED EMBODIMENTS

Embodiment 1

Figure 1:
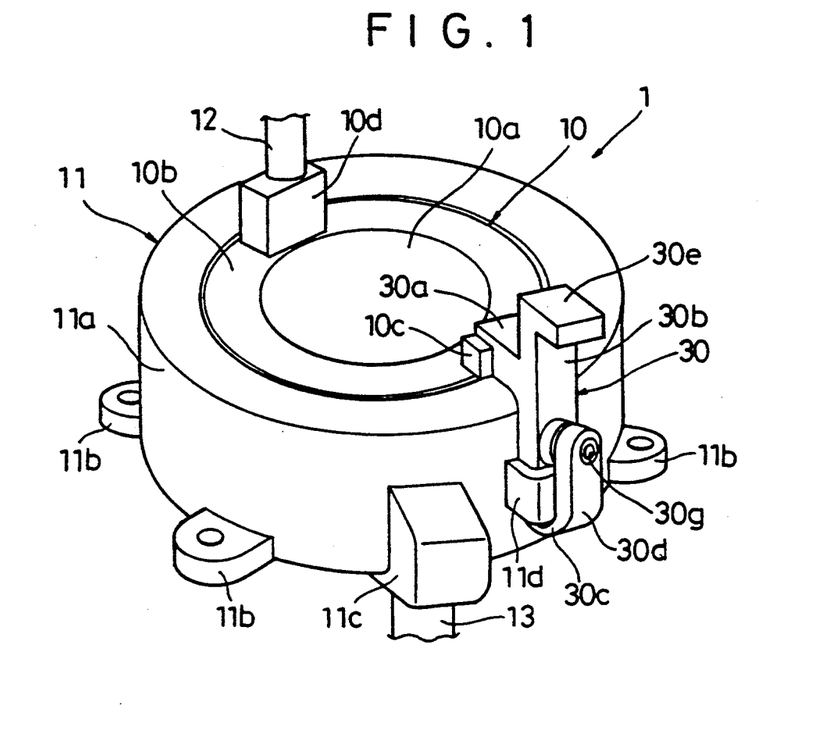
FIG. 1 is a perspective view of a rotary connector according to a first embodiment of the present invention.

As shown in FIG. 1, a rotary connector 1 comprises a rotating case 10 and a stationary case 11, combined for rotation and defining an annular space therein, a flexible flat cable 20 housed in the annular space (see FIG. 2), and a fixing pin 30 for regulating the relative rotation of the cases 10 and 11.

The rotating case 10 includes an inner cylinder shaft portion 10a and an upper flange 10b. The upper flange 10b is provided with mounting projections 10c for mounting the fixing pin 30. A junction 10d is located in a position opposite to the mounting projections 10c.

Figure 2:
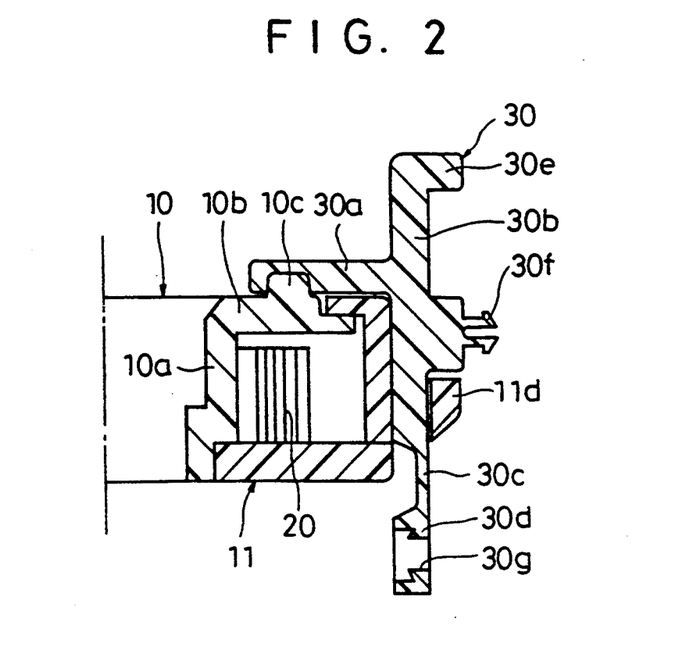
FIG. 2 is a front sectional view of the right-hand half of the rotary connector of FIG. 1 with its fixing pin not fixed.

The stationary case 11 is a case which is fixedly mounted on the vehicle-body side. A plurality of mounting flanges 11b and a junction 11c are arranged individually in suitable positions at the lower part of an outer cylinder portion 11a of the case 11. The peripheral wall of the outer cylinder portion 11a is formed integrally with an insert holder portion 11d which serves as a mounting portion to mount the fixing pin 30 in conjunction with mounting projections 10c. As shown in FIG. 2, the lower part of the holder portion 11d is sharply tapered so that a hinge portion 30c (mentioned later) of the fixing pin 30 can be easily cut. The proper angle of taper of the lower part of the holder portion 11d ranges from about 30° to 90°.

Figure 3:
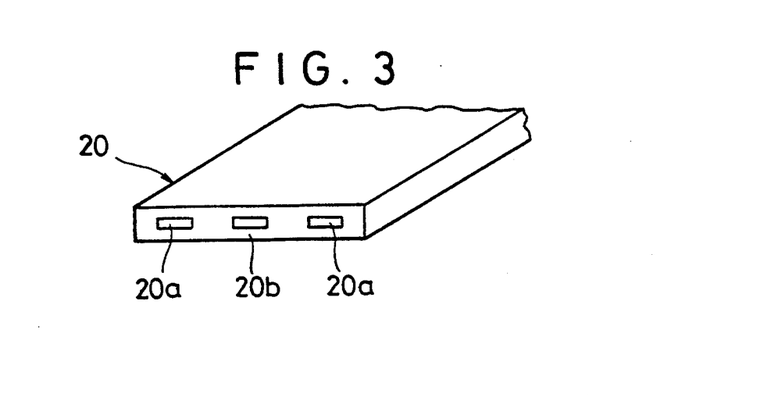
FIG. 3 is a perspective view of a flat cable used in the rotary connector.

The flat cable 20 is a flexible belt-shaped transmission medium for transmitting electrical signals, optical signals, electric power, etc. As shown in FIG. 3, for example, the cable 20 is an electrical transmission medium which comprises a plurality of flat rectangular electrical conductors 20a, arranged parallel to one another, and an insulator 20b, such as a polyester film, covering the conductors 20a. The cable 20 is housed in the form of a spiral in the annular space which is defined by the cases 10 and 11. The inner and outer ends of the cable 20 are connected to external wires 12 and 13 at the junctions 10d and 11c, respectively.

Figure 4:
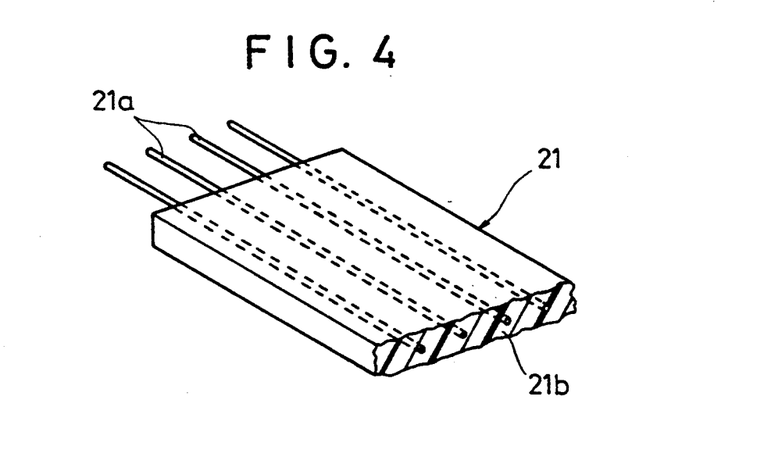
FIG. 4 is a cutaway perspective view of a modification of the flat cable used in the rotary connector.
Figure 5:
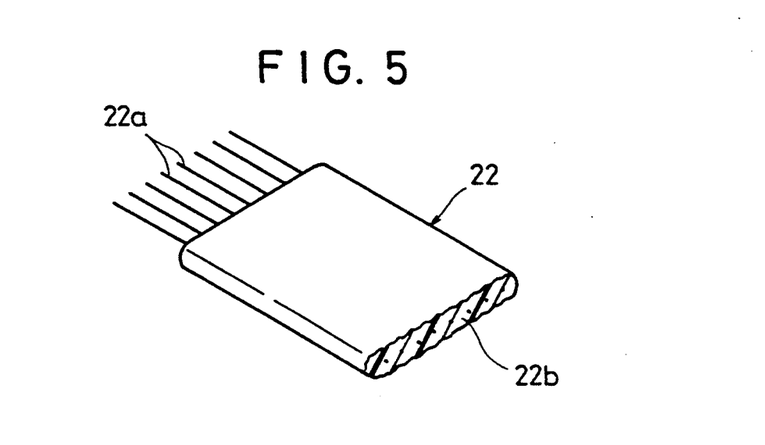
FIG. 5 is a cutaway perspective view of another modification of the flat cable used in the rotary connector, in which a light transmission medium is shown in section.

The flat cable may alternatively be constructed in the manner shown in FIG. 4 or 5. A flat cable 21 shown in FIG. 4 is an electrical transmission medium which comprises a plurality of electrical conductors 21a, having a circular cross section and arranged parallel to one another, and an insulation material 21b covering the conductors 21a. A flat cable 22 shown in FIG. 5 is a light transmission medium in the form of a tape fiber which comprises a plurality of optical fibers 22a for transmitting optical signals and a covering material 22b on the fibers 22a. Alternatively, moreover, the flat cable may be a combination of an electrical transmission medium and a light transmission medium, comprises electrical conductors and optical fibers covered by an insulation material.

The fixing pin 30 serves to regulate the relative rotation of the cases 10 and 11 which are combined for rotation. As shown in FIGS. 1 and 2, the pin 30 comprises a stopper piece 30a, an insert piece 30b extending at right angles to the piece 30a, a thin wall hinge portion 30c, and a retaining portion 30d, these elements being formed by integral molding from a synthetic resin, such as acrylonitrile-butadiene-styrene (ABS), polypropylene, polyamide, or polyethylene. The pin 30 is mounted extending between the insert holder portion 11d and the mounting projections 10c.

The stopper piece 30a, which is located between the mounting projections 10c, regulates the rotation of the rotating case 10 relative to the stationary case 11. The insert piece 30b is attached to the insert holder portion 11d of the stationary case 11 so that the fixing pin 30 is mounted on the rotary connector 1. A flange portion 30e is formed on the upper end of the piece 30b, and a lock portion 30f having a locking hook is formed on the middle portion of the piece 30b. The hinge portion 30c serves as an indicator for indicating the release of the release of the rotating and stationary cases 10 and 11 from fixation by means of the fixing pin 30. Only the hinge portion 30c, which also serves to connect the insert piece 30b and the retaining portion 30d, is thin-walled so that it can be easily cut by means of the tapered lower part of the insert holder portion 11d. The retaining portion 30d, which has a lock hole 30g for engagement with the locking hook of the lock portion 30f, restrains the fixing pin 30 from being disengaged from between the mounting projections 10c and the insert holder portion 11d.

The fracture strength of the hinge portion 30c against a drawing force acting thereon can be suitably modified by changing its sectional area. Preferably, the sectional area is adjusted to about 0.4 to 2.0 $mm^2$ so that the hinge portion 30c can be fractured by the drawing force of 2 to 10 kgf.

In the rotary connector 1 according to the present embodiment, constructed in this manner, the flat cable 20 is first housed in the form of a spiral in the annular space defined by the rotating and stationary cases 10 and 11, and the two cases 10 and 11 are combined with each other.

Then, the flat cable 20 in the cases 10 and 11 is oriented to a neutral position with respect to its tightening and loosening actions, the fixing pin 30 is passed through the insert holder portion 11d of the stationary case 11 with its retaining portion 30d forward so that the stopper piece 30a is located between the mounting projections 10c, as shown in FIG. 2.

Figure 6:
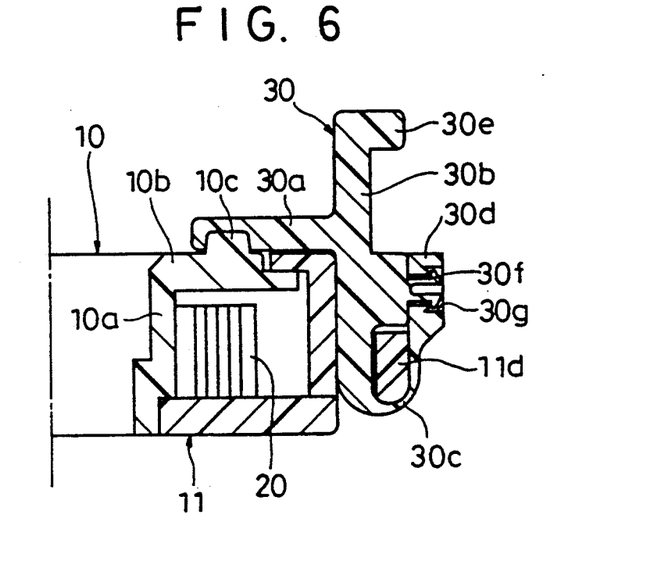
FIG. 6 is a front view of the right-hand half of the rotary connector of FIG. 1 with its fixing pin fixed.

Subsequently, the retaining portion 30d is bent outward at the hinge portion 30c, and the lock portion 30f is fitted in the lock hole 30g, whereby the fixing pin 30 is fixedly mounted on the rotary connector 1, as shown in FIG. 6. Thus, the fixing pin 30 is fixed to the insert holder portion 11d, whereupon it cannot be disengaged from the rotary connector 1 unless the hinge portion 30c is fractured by a drawing force of at least 2 kgf or more.

In this manner, the assembly of the rotary connector 1 is completed, and the fixing pin 30 is fixed to the insert holder portion 11d, so that the rotating case 10 is restrained from rotating relatively to the stationary case 11.

Thus, the rotary connector 1 is restricted in torque by the fixing pin 30, so that it can be firmly fixed without the possibility of the pin 30 being fractured like a seal. Unless subjected to the drawing force, therefore, the fixing pin 30 cannot be easily disengaged from the rotating case 10 during transportation or the like, and the flat cable 20 can be kept in the neutral position for the time of assembly.

Figure 7:
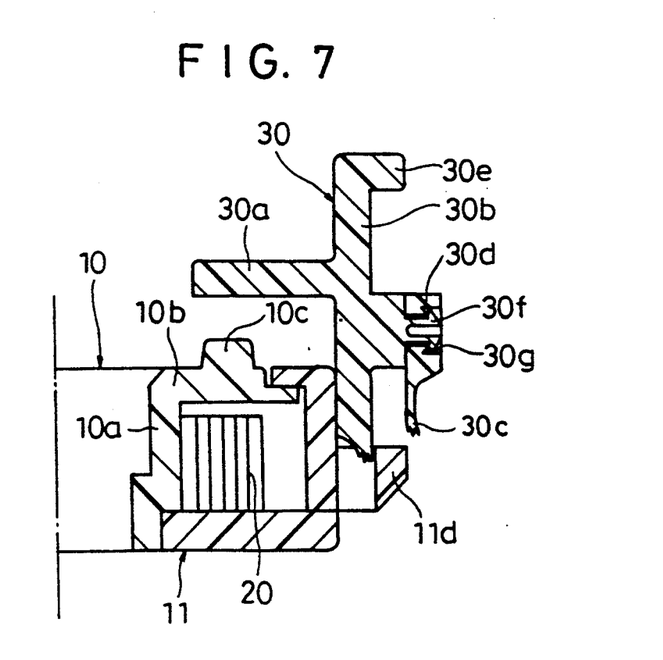
FIG. 7 is a front view of the right-hand half of the rotary connector of FIG. 1 with a hinge portion of the fixing pin fractured by a drawing force acting thereon.

In operation, if the fixing pin 30 is drawn out upward under the force of 2 to 10 kgf with fingers on the flange portion 30e, the hinge portion 30c is cut by the insert holder portion 11d, as shown in FIG. 7, so that the rotating and stationary cases 10 and 11 are released from the fixation.

According to the rotary connector 1 arranged in this manner, the removal of the fixation after the assembly can be recognized at a glance from the fracture of the hinge portion 30c of the fixing pin 30. Thus, the fixing pin 30 also has a sealing and indicating function.

The following is a description of alternative embodiments of the present invention. Any of the fixing pins are formed integrally from a synthetic resin. The reference numerals designating corresponding portions are the same as those for the foregoing embodiment, and a detailed description of those portions is omitted.

Embodiment 2

Figure 8:
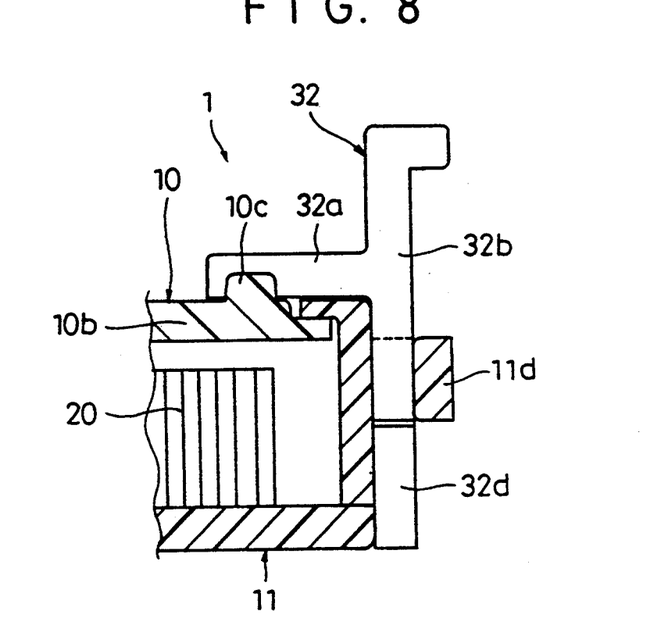
FIG. 8 is a front view of the right-hand half of a rotary connector according to a second embodiment of the present invention fixed by means of a fixing pin.
Figure 9:
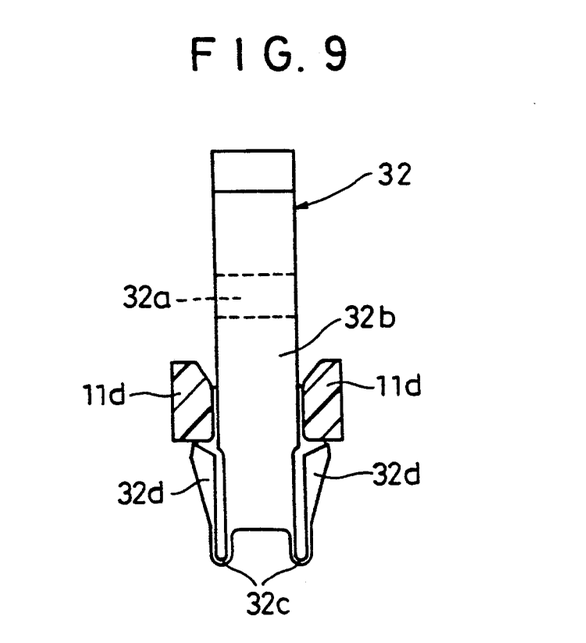
FIG. 9 is a side view of the fixing pin shown in FIG. 8.

FIGS. 8 and 9 show a second embodiment of the present invention. A fixing pin 32 comprises a stopper piece 32a, an insert piece 32b extending at right angles to the piece 32a, and locking hooks 32d supported integrally on the opposite sides of the lower part of the insert piece 32b by means of thin-walled hinge portions 32c, individually. Each hinge portion 32c serves as an indicator for indicating the release of the rotating and stationary cases 10 and 11 from fixation by means of the fixing pin 32.

Thus, when the insert piece 32b of the fixing pin 32, along with the locking hooks 32d, is passed through the insert holder portion 11d in assembling the rotary connector 1, the stopper piece 32a is located between the mounting projections 10c, and the hooks 32d are anchored to the lower part of the holder portion 11d.

In the rotary connector 1, therefore, the rotating and stationary cases 10 and 11 are kept fixed to each other unless the fixing pin 32 is drawn out of the insert holder portion 11d. When the fixing pin 32 is drawn out of the holder portion 11d to release the cases 10 and 11 from the fixation after the assembly of the connector 1, moreover, the hinge portions 32c are deformed or fractured so that the locking hooks 32d are removed. From this state of things, the removal of the fixation can be recognized with ease.

Embodiment 3

Figure 10:
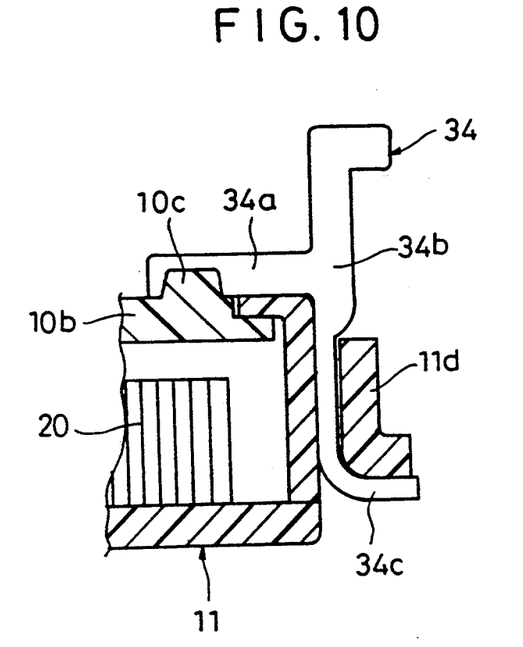
FIG. 10 is a front view of the right-hand half of a rotary connector according to a third embodiment of the present invention fixed by means of a fixing pin.
Figure 11:
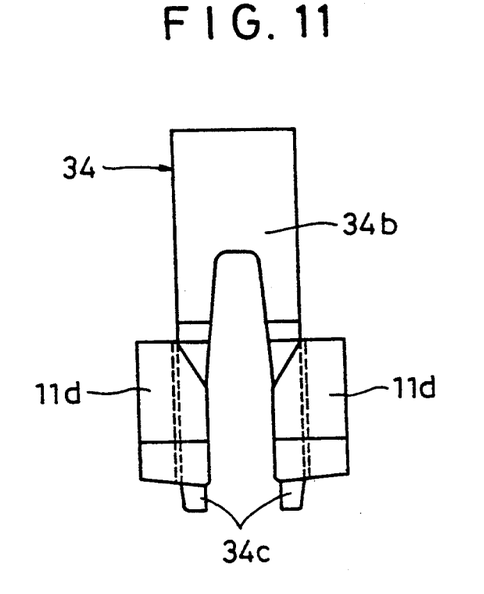
FIG. 11 is a side view of the fixing pin shown in FIG. 10.

In the present embodiment, as shown in FIGS. 10 and 11, the insert holder portion 11d of the stationary case 11 is formed of two guide pieces. The lower part of each guide piece is bent radially outward. A fixing pin 34 comprises a stopper piece 34a, an insert piece 34b extending at right angles to the piece 34a and having a bifurcated lower portion, and L-shaped portions 34c bent outward. Each bent portion 34c serves as an indicator for indicating the release of the rotating and stationary cases 10 and 11 from fixation by means of the fixing pin 34.

Thus, according to the present embodiment, when the insert piece 34b of the fixing pin 34 is passed through the insert holder portion 11d, whose lower part is bent outward to fit the piece 34b, in order to fix the rotating and stationary cases 10 and 11, the bent portions 34c undergo elastic deformation, and the stopper piece 34a is located between the mounting projections 10c. Thus, the fixing pin 34 can be smoothly mounted on the rotary connector 1.

Figure 12:
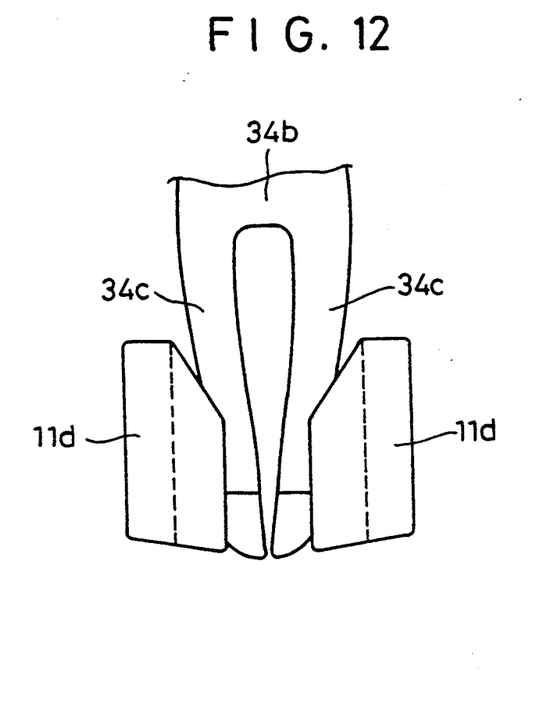
FIG. 12 is a side view of the principal part of the fixing pin shown in FIG. 10, showing the way the fixing pin is drawn out.
Figure 13:
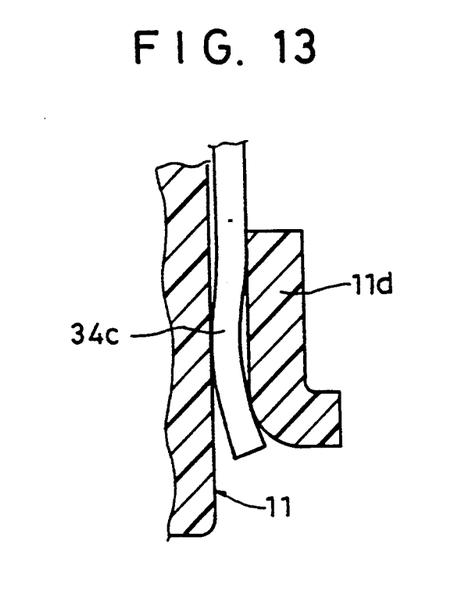
FIG. 13 is a front sectional view of the principal part of FIG. 12.

In drawing out the fixing pin 34 from the insert holder portion 11d in order to release the rotating and stationary cases 10 and 11 from the fixation, on the other hand, the bent portions 34c are caught by the lower part of the holder portion 11d, thereby producing a substantial resistance. If the pin 34 is drawn out by force against this resistance, the bent portions 34c are permanently deformed by the holder portion 11d, as shown in FIGS. 12 and 13.

Thus, also in the present embodiment, the removal of the fixing pin 34 after the assembly of the rotary connector 1 can be recognized at a glance from the deformation of the bent portions 34c.

Embodiment 4

Figure 14:
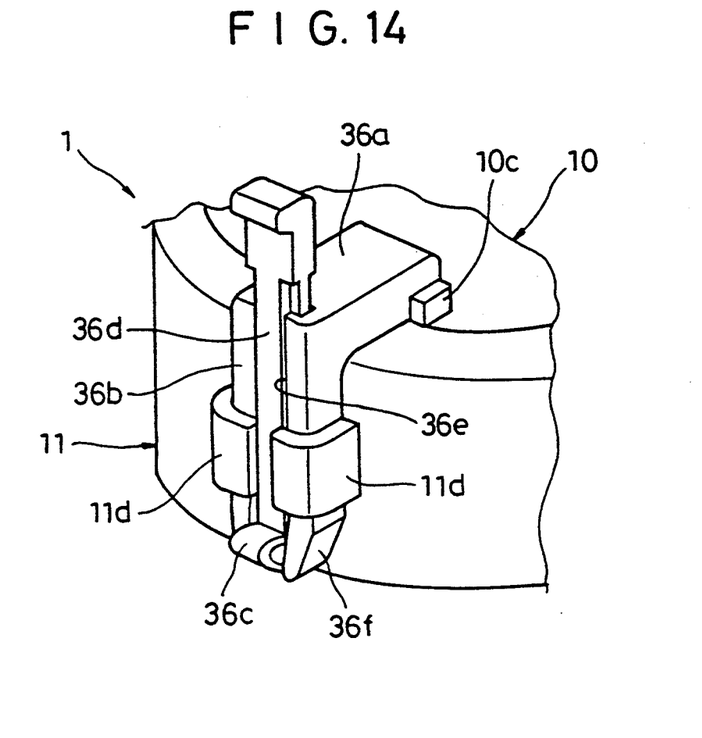
FIG. 14 is a perspective view of the principal part of a rotary connector according to a fourth embodiment of the present invention fixed by means of a fixing pin.
Figure 15:
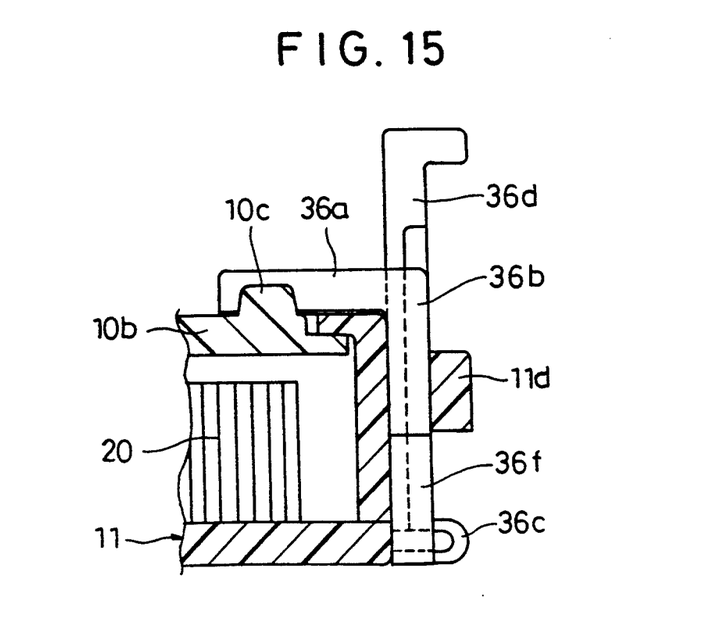
FIG. 15 is a front sectional view showing the right-hand half of the principal part of the rotary connector of FIG. 1.
Figure 16:
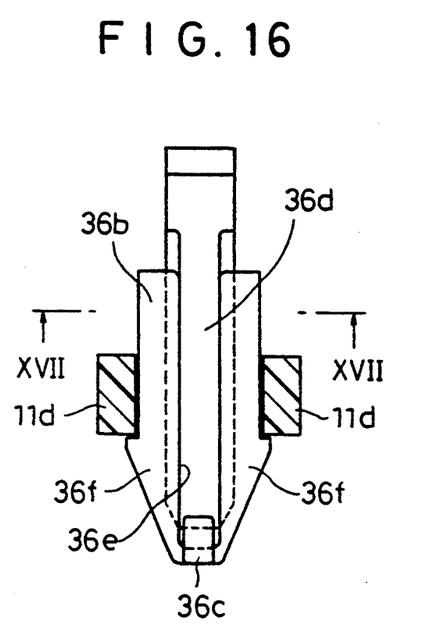
FIG. 16 is a side view of the fixing pin shown in FIG. 15.
Figure 17:
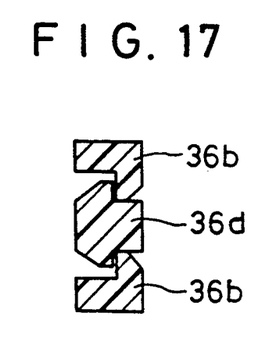
FIG. 17 is a sectional view taken along line XVII—XVII of FIG. 16.

Referring now to FIGS. 14 to 17, a fourth embodiment of the present invention will be described. In the present embodiment, as shown in FIG. 14, the insert holder portion 11d of the stationary case 11 is formed of two guide pieces. As shown in FIG. 15, moreover, a fixing pin 36 comprises a stopper piece 36a, an insert piece 36b extending at right angles to the piece 36a, and a sealing key 36d supported integrally on the lower end of the insert piece 36b by means of a thin-walled hinge portion 36c. A vertical fitting groove 36e is formed in the center of the insert piece 36b. In the present embodiment, the hinge portion 36c serves as an indicator.

Retaining hooks 36f, which protrude individually from the opposite sides of the lower part of the insert piece 36b, serve to prevent disengagement by engaging the insert holder portion 11d. The fitting groove 36e engages and holds the sealing key 36d.

In the present embodiment, the fixing pin 36 is mounted on the rotary connector 1 in a manner such that the sealing key 36d is fitted in the fitting groove 36e, the stopper piece 36a is located between the mounting projections 10c of the rotating case 10, and the insert piece 36b, along with the sealing key 36d, is inserted in the insert holder portion 11d. Thus, the rotating and stationary cases 10 and 11 are restrained from relative rotation. When the insert piece 36b is inserted in the holder portion 11d, in this case, the retaining hooks 36f at the lower part of the piece 36b engage the holder portion 11d, so that the fixing pin 36 cannot be easily disengaged.

In releasing the cases 10 and 11 from the fixation after the assembly of the rotary connector 1, the sealing key 36d is pulled upward with the force of at least 2 kgf or more. Thereupon, only the key 36d of the fixing pin 36 can be pulled up along the fitting groove 36e of the insert piece 36b, since the retaining hooks 36f of the piece 36b are in engagement with the insert holder portion 11d.

Accordingly, the hinge portion 36c at the lower part of the insert piece 36b is pulled and fractured, so that the sealing key 36d of the fixing pin 36 is disengaged from the piece 36b. As a result, the hinge portion 36c is removed from the lower part of the fitting groove 36e, so that the insert piece 36b is bifurcated. If the width of the insert piece 36b is narrowed by holding the retaining hooks 36f, the hooks 36f can be disengaged from the insert holder portion 11d. The fixing pin 36 can be easily removed from the rotary connector 1 by being pulled up in this state.

Thus, also in the present embodiment, the release of the rotating and stationary cases 10 and 11 from the fixation, which accompanies the removal of the fixing pin 36 after the assembly of the rotary connector 1, can be recognized from the fracture of the hinge portion 36c or the absence of the sealing key 36d.

Embodiment 5

Figure 18:
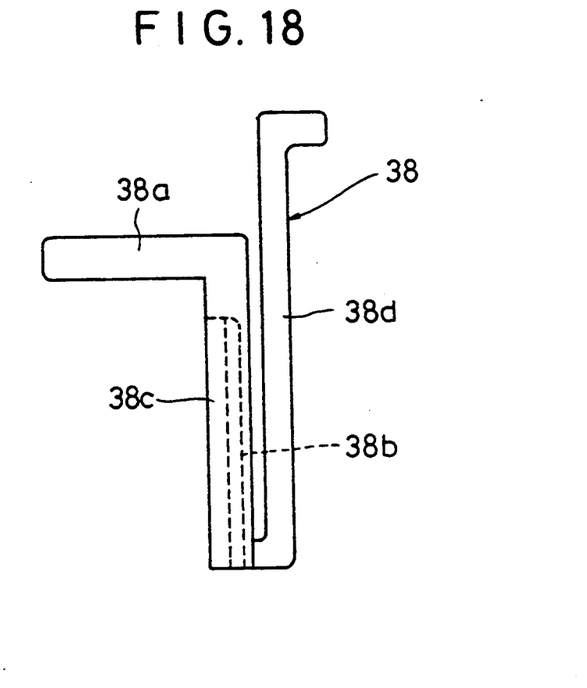
FIG. 18 is a front view of a fixing pin, showing the principal part of a fifth embodiment of the present invention.
Figure 19:
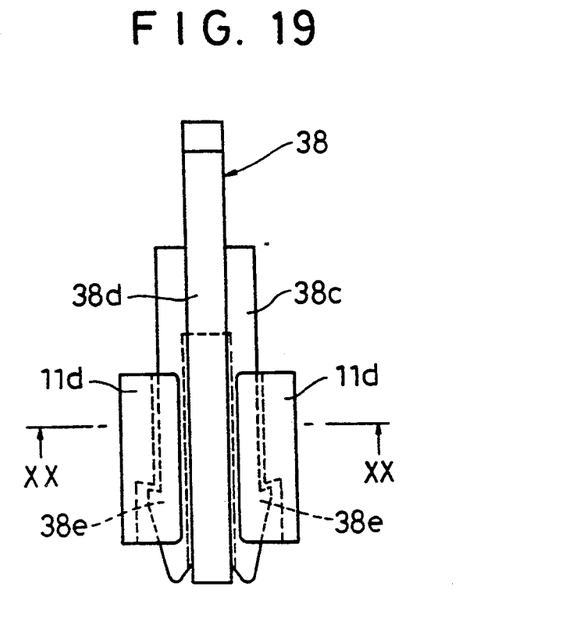
FIG. 19 is a side view of the fixing pin of FIG. 18 attached to a mounting portion of a stationary case.
Figure 20:
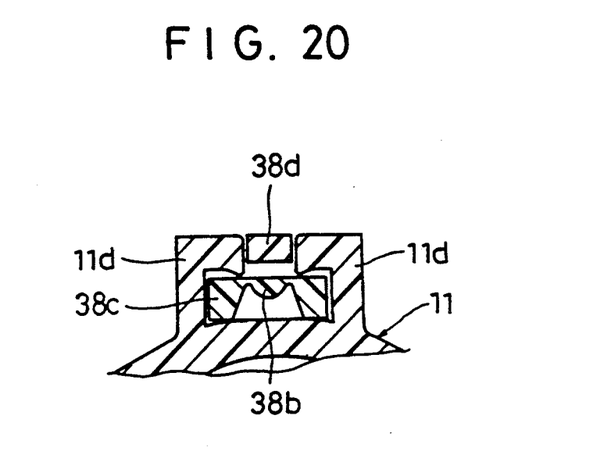
FIG. 20 is a sectional view taken along line XX—XX of FIG. 19.

Referring now to FIGS. 18 to 21, a fifth embodiment of the present invention will be described. In the present embodiment, as shown in FIG. 19, the insert holder portion 11d is formed of two guide pieces. As shown in FIGS. 18 and 20, moreover, a fixing pin 38 comprises a stopper piece 38a, an insert piece 38c having a thin-walled portion 38b vertically extending in the center, and a sealing key 38d rising up integrally from the lower end of the thin-walled portion 38b. Retaining hooks 38e are arranged individually on the opposite sides of the lower part of the insert piece 38c. In this case, the thin-walled portion 38b serves as an indicator.

In the present embodiment, the fixing pin 38 is mounted on the rotary connector 1 in a manner such that the stopper piece 38a is located between the mounting projections 10c of the rotating case 10, and the insert piece 38c is inserted in the insert holder portion 11d. Thus, the rotating and stationary cases 10 and 11 are restrained from relative rotation.

Figure 21:
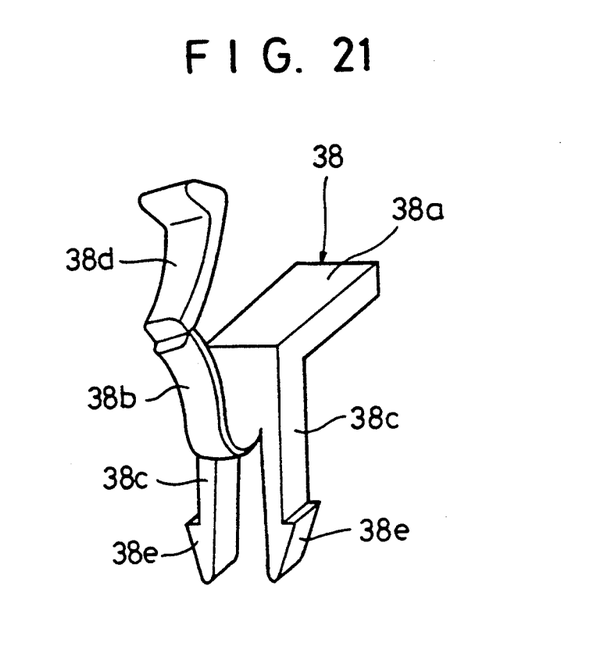
FIG. 21 is a perspective view showing the fixing pin with a thin-walled portion of its insert piece fractured.

In releasing the cases 10 and 11 from the fixation after the assembly of the rotary connector 1, the sealing key 38d is pulled upward with the force of at least 2 kgf or more. Thereupon, the thin-walled portion 38b, which is susceptible to stress, is fractured and removed from the insert holder portion 11d and pulled up together with the key 38d, since the retaining hooks 38e of the piece 38c are in engagement with the insert holder portion 11d.

As a result, the lower part of the insert piece 38c is bifurcated. If the width of the piece 38c is narrowed by holding the retaining hooks 38e, therefore, the hooks 38e can be disengaged from the insert holder portion 11d. The fixing pin 38 can be easily removed from the rotary connector 1 by being pulled up in this state.

Also in the present embodiment, as is evident from the above description, the release of the rotating and stationary cases 10 and 11 from the fixation, which accompanies the removal of the fixing pin 38 after the assembly of the rotary connector 1, can be recognized from the fracture and removal of the thin-walled portion 38b from the insert piece 38c. In this case, the thin-walled portion 38b serves as an indicator.

What is claimed is:

1. In a rotary connector which comprises a rotating case and a stationary case coupled together for relative rotation therebetween, said cases defining an annular space therein, a flexible flat cable housed in the form of a spiral in said annular space, and a fixing member for regulating the relative rotation of said cases, said fixing member being removably mounted to said cases and extending between said cases, said flexible flat cable tightening and loosening in said annular space so that the rotating case is rotatable relative to the stationary case, the improvement comprising:
a mounting means on each of said cases, said fixing member being removably coupled to said mounting means of each of said cases and extending between said mounting means of each of said cases for fixing said cases in a fixed state relative to each other to prevent relative movement therebetween; and said fixing member being provided integrally with an indicating portion for restraining said fixing member from being disengaged from said mounting means and for visually indicating a release of said cases from said fixed state by being fractured or deformed by application of a predetermined stress to said indicating portion which forces said fixing member to be disengaged from said mounting means.

2. A rotary connector according to claim 1, wherein:
said mounting means of said rotating case includes at least two mounting portions;
said indicating portion of said fixing member comprises a thin-walled portion of said fixing member; and
said fixing member includes a stopper piece arranged between said mounting portions of said rotating case, an insert piece extending substantially at right angles to the stopper piece and inserted in said mounting means of said stationary case, a retaining portion supported by said thin-walled indicating portion continuous with the insert piece, and a lock portion for engagedly fixing the retaining portion after said fixing member is bent at said indicating portion, said stopper piece, said retaining portion, said lock portion, and said indicating portion of said fixing member all being formed by integral molding from a synthetic resin.

3. A rotary connector according to claim 2, wherein the cross sectional area of said thin-walled indicating portion is from 0.4 to 2.0 mm$^2$, and said thin-walled indicating potion is fracturable by application of a stress of 2 to 10 kgf which causes said fixing member to be disengaged from said mounting means.

4. A rotary connector according to claim 1, wherein:
said mounting means of said rotating case includes at least two mounting portions;
said indicating portion of said fixing member comprises a thin-walled portion of said fixing member; and
said fixing member includes a stopper piece arranged between said mounting portions of said rotating case, an insert piece extending substantially at right angles to the stopper piece and inserted in said mounting means of said stationary case, and a lock portion supported individually on opposite sides of a lower portion of the insert piece by means of said thin-walled indicating portion and anchored to said mounting means of said stationary case, said stopper piece, said insert piece, said lock portion and said indicating portion of said fixing member all being formed by integral molding from a synthetic resin.

5. A rotary connector according to claim 4, wherein said thin-walled indicating portion is fracturable by a stress of 2 to 10 kgf which causes said fixing member to be disengaged from said mounting means.

6. A rotary connector according to claim 1, wherein:

said mounting means of said rotating case includes at least two mounting portions; and said fixing member includes a stopper piece arranged between said mounting portions of said rotating case, an insert piece extending substantially at right angles to the stopper piece and inserted in said mounting means of said stationary case, and said indicating section being L-shaped and formed by bifurcating an end portion of the insert piece and bending the bifurcate end portion outward in radial direction of said stationary case, said stopper piece, said insert piece, and said indicating section of said fixing member all being formed by integral molding from a synthetic resin.

7. A rotary connector according to claim 1, wherein:

said mounting means of said rotating case includes at least two mounting portions;

said indicating portion of said fixing member comprises a thin-walled portion of said fixing member; and said fixing member includes a stopper piece arranged between said mounting portions of said rotating case, an insert piece extending substantially at right angles to the stopper piece, having a fitting groove in a center portion thereof and retaining hooks on either side of the fitting groove, and inserted in said mounting means of said stationary case, and a sealing key supported on the insert piece by means of said thin-walled indicating portion, said stopper piece, said insert piece, said sealing key, and said indicating section of said fixing member all being formed by integral molding from a synthetic resin.

8. A rotary connector according to claim 1, wherein:

said mounting means of said rotating case includes at least two mounting portions; and said fixing member includes a stopper piece located between said mounting portions of said rotating case, an insert piece extending substantially at right angles to the stopper piece, having a thin-walled portion longitudinally extending in a center portion thereof and retaining hooks, and inserted in said mounting means of said stationary case, and a sealing key continuous with the insert piece, said stopper piece, said insert piece, and said sealing key of said fixing member all being formed by integral molding from a synthetic resin.

* * * * *